Aug. 11, 1931.  A. A. DICKE ET AL  1,818,698
MOTOR FOR HEAT REGULATORS
Filed Jan. 16, 1928  2 Sheets-Sheet 2
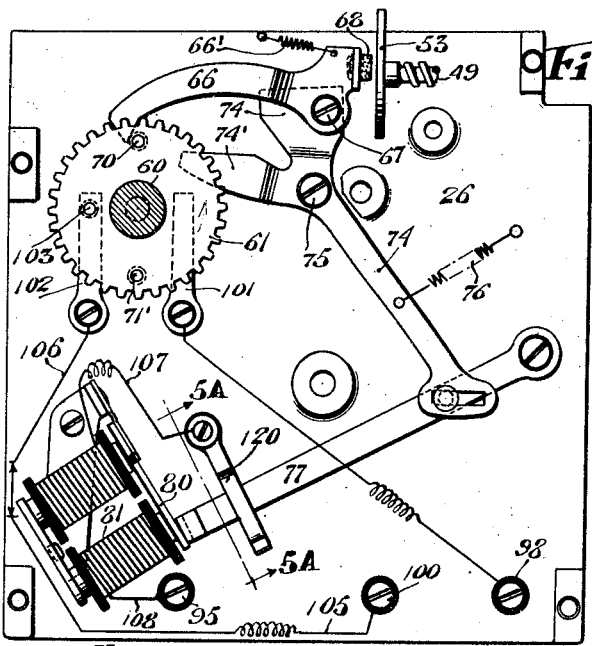
Inventors
Allen A. Dicke
Carl H. Dicke Patented Aug. 11, 1931

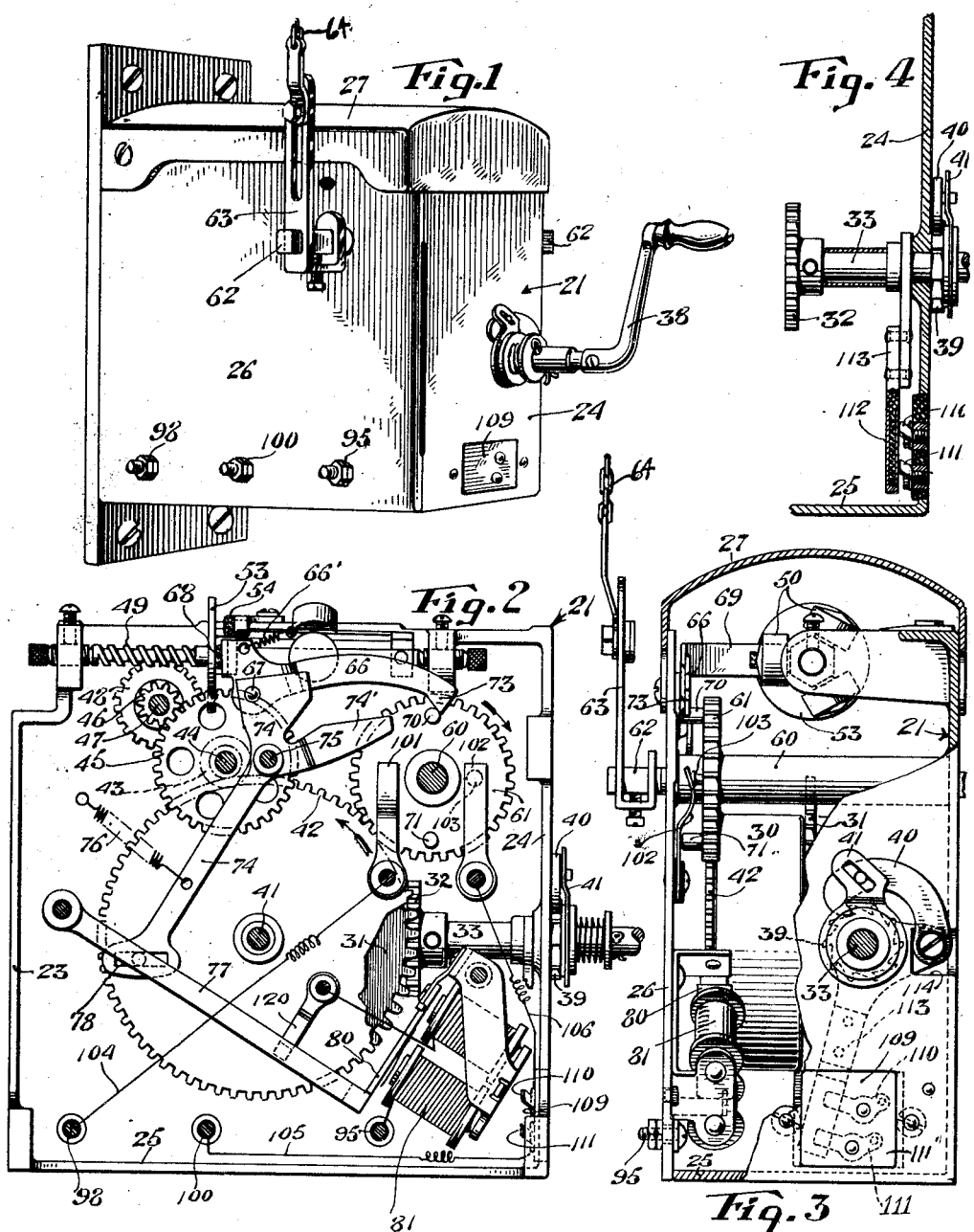

1,818,698

UNITED STATES PATENT OFFICE

ALLEN A. DICKE, OF MONTCLAIR, AND CARL H. DICKE, OF NUTLEY, NEW JERSEY

MOTOR FOR HEAT REGULATORS

Application filed January 16, 1928. Serial No. 247,183.

This invention relates to motors for heat regulators and has for its object the provision of a suitable distant controlled motor suitable for controlling the draft dampers of furnaces, or the valves of heating and cooling systems.

In its preferred use the motor is controlled by a thermo-responsive two point switch of known or suitable design. Switches of this sort are arranged to close a circuit when the temperature reaches a certain specified point and to open said circuit and to close another circuit when the temperature drops to a certain extent. The motor which represents one embodiment of the present invention is so organized as to be controlled by current flowing in said respective circuits to open the drafts or to close the drafts as required or to adjust the valves of the heating or cooling system as may be required.

An object of the invention is to provide a motor operable by potential energy (as the energy of a spring), under electric control, which is durable, reliable, and quiet in operation.

Another object is to provide such a motor with a centrifugal governor to control its speed of running and to assure quiet operation.

Another object is to provide means for stopping the motor at a suitable point or points in its operation, said means acting on said governor means.

A most important object is the provision of a motor of this type provided with an energy storing device as a spring and a motive device, as an electric motor for periodically replenishing the stored power. In this way a continual supply of stored energy is assured in spite of possible periodic failures of the current supplied to the electric motor.

Another object relates to the provision of means permitting the removal of the electric motor and the substitution of hand winding means in the event of a complete failure or unavailability of the electric supply.

Other objects relate to the provision of suitable means for causing the motor to be stopped at suitable points by the operation of a brake actuated by the motor itself, means for releasing said brake under electric control, means for stopping the flow of current as soon as the release has been effected, and means for breaking the control circuit when the driving spring is run down.

Other objects relate to miscellaneous details of construction which will become apparent as the description proceeds.

In the attached drawings, which form a part of this specification, Figure 1 is a perspective view of a motor illustrating one form of embodiment of the invention, the rewind apparatus having been removed and the emergency winding crank shown substituted.

Fig. 2 is a vertical sectional view taken just inside the cover plate, showing various parts carried by the cover plate.

Fig. 3 is a front elevation, a part of the front wall being shown cut away to expose a part of the mechanism.

Fig. 4 is a partial sectional view of parts shown in Fig. 3.

Fig. 5 is a view of the cover plate and the various parts carried thereby.

Fig. 5A is a partial sectional view on the line 5A—5A of Fig. 5.

Fig. 6 is the reverse of Fig. 3.

Fig. 7 is a top plan view.

Fig. 8 is a side elevation with the winding apparatus in place.

Fig. 9 is a wiring diagram.

In said drawings the numeral 21 represents the main casting, preferably formed with a side wall 22, a back wall 23, a front wall 24, a bottom 25, and a detachable cover 26. A suitable cover 27 may also be provided to enclose the mechanism.

The spring motor, which resembles in many respects the type of motor usually used to drive phonograph turn tables, may have one or more energy storage springs enclosed in the usual way in housings 29 and 30. To wind the springs the housing 29 may have attached thereto for rotation therewith a spur gear 31, meshing with a gear 32 carried on the winding shaft 33. The other end of said shaft is usually connected with a suitable power winding device such as a worm wheel 34 driven by a worm 35 rotating with the armature shaft of a usual type of electric motor 36. The current for said motor is supplied through the conductors 37. When the springs become almost completely wound the shaft 33 sets up a greater resistance to rotation with the result that the worm 35 is forced in an axial direction against the reaction of a spring (not shown). This axial rotation causes the power circuit to be opened and the winding discontinued. Similarly, when the springs have been sufficiently run down the circuit is reestablished and the springs rewound by the motor 36. The construction of this rewind device is not described in detail here as it is not a part of the present invention. For a more detailed description reference may be had to the patented art, particularly U. S. Patent No. 1,257,286. Various combinations in which said rewind device form an element are, however, new and form a part of the present invention.

If for any reason the rewind motor is not to be employed, such as a power failure, it may be readily detached and a hand crank 38 substituted. In order to prevent retrograde movement of the crank and shaft 33 after winding a suitable holding pawl mechanism should be employed. As shown, this may consist of a ratchet wheel 39 attached to the shaft 33 for rotation therewith and a holding pawl 40 cooperating therewith. This pawl may be mounted directly on the wall 24. However, under certain conditions and for certain purposes it may be mounted on an intermediate member as will be described later. The pawl 40 may be pressed against the ratchet wheel 39 by gravity, by a spring, or by a friction device of known construction, as by using a plate 41 frictionally driven by the shaft 33 and having a pin and slot connection with the pawl 40 to raise the pawl from the ratchet wheel when the shaft 33 is turned in a winding direction and to draw the pawl 40 against the ratchet wheel when the shaft 33 is allowed to turn backwardly after winding, thus serving to arrest backward movement.

The spring in the housing 29 has one end attached to the housing 29 and the other end to the shaft 41. Likewise the spring in the housing 30 has one end attached to said shaft 41 and the other end to the housing 30. This is a well known construction and provides for a tandem or series arrangement for the springs which tend to turn the housing 30 and the gear 42 attached thereto in the direction indicated by the arrow in Fig. 2. The gear 42 engages a suitable speed controlling gear train. This may, as shown, comprise a pinion 43, engaged by gear 42, and mounted on a shaft 44 which also carries gear 45. Gear 45 engages and drives pinion 46 mounted on shaft 47, which also carries the worm wheel 48. As is usual in phonograph motors this worm wheel drives the worm 49, which is preferably mounted on pivoted bearings as shown. As is usual, the governor balls 50 are mounted on springs 51, one end of each of which is attached to a sliding collar 52 formed with a governor flange 53. This flange may cooperate with a brake 54 to keep the speed down to a certain point when the motor is released for operation. As the speed increases the centrifugal forces draw the balls 50 outward thus flexing the springs 51 and drawing the collar 52 and flange 53 to the left (Fig. 7) until the flange engages the brake 54. This construction provides a uniformly running motor which is very quiet in operation, the latter characteristic being due to the fact that the entire gear train is working against the resistance imposed by the brake 54 thus avoiding backlash and the resulting noise.

In a motor of this type, in order to get the two desired positions of adjustment of the dampers or their equivalent, it is desirable and convenient to have a shaft bearing a crank on either end from which chains, or the like, run to the devices to be controlled. The shaft bearing the numeral 60 is provided for this purpose. It is journaled in the wall 22 and the cover plate 26 and carries a gear 61 engaged by one of the gears driven by the motor springs, in the present instance the gear 42. The shaft extends beyond its bearings, its ends being formed for convenient attachment of cranks as by having its ends squared as shown at 62. Cranks 63 are attached to these ends. To said cranks are attached chains 64 leading to the dampers or other devices to be adjusted.

To secure the desired adjustment, means are provided to release the gear train for operation sufficiently long to permit the shaft 60 to turn one-half of a revolution and then to stop the motor until a return adjustment is desired.

For this purpose novel means have been provided, consisting, generally, in devices set in motion by the operation of the motor itself and operating to stop the motor when a half turn of shaft 60 has been effected. This new concept may be expressed in various ways in practice. In the form shown the stopping is effected by applying a brake to the flange 53 but, as is clear, other stopping means might be employed. In the form shown, a brake lever 66 is provided, carried by a floating pivot 67, and formed with a brake pad 68 carried on a lateral extension 69. The brake pad is shown in Fig. 2 as in contact with the governor flange 53. Suitable means are provided to cause application of the brake pad 68 at each half turn of shaft 60. This means may consist of protuberances mounted for rotation with said shaft such as pins 70 and 71 carried by gear 61, 180° apart. These pins cooperate alternately with an extension 73 of the brake lever 66. The pivot 67 of lever 66 may be carried by the pivot support lever 74, pivoted at 75 to the cover plate 26. It may be urged in a clockwise direction as by the spring 76. Similarly, brake lever 66 may be urged in a clockwise direction as by spring 66'. The lower end of lever 74 cooperates with holding means as the lever 77 with which it may be connected by the pin and slot connection 78. The end of lever 77 is shown in Fig. 2 as bearing against a removable abutment as the armature 80 of an electro magnet 81. It will be seen that if the parts are in the position shown in Fig. 2, and the magnet 81 is energized that the brake pad 68 will be withdrawn from the governor flange 53. As soon as the armature 80 frees the end of the lever 77, said lever will be drawn upwardly by spring 76 acting through the pin and slot connection. See Fig. 5. The arm 74 is moved clockwise (Fig. 2), thus moving the floating pivot 67 to the right, moving the brake pad 68 away from the governor flange. The parts have now assumed the position shown in Figs. 5 and 7, the motor being released for operation.

As the motor starts, the balls 50 expand, drawing the flanges 53 against the pad 54 which serves to prevent excessive speed of operation. The pin 70 passes beyond the extension 73 thus permitting the pad 68 to be moved further from the governor flange. The pin 71 gradually moves around to the position originally held by the pin 70. In so doing, it strikes the extension 74' of the pivot carrying lever 74, moving it counter-clockwise (Fig. 2) and depressing the lever 77 to a point beyond the end of armature 80. As the pin 71 clears the extension 74' the parts 74 and 77 resume their positions as shown in Fig. 2. The floating pivot is now in such a position that the brake pad 68 will be pushed to the left (Fig. 2) as soon as pin 71 by engagement with arm 66 and particularly extension 73 thereof oscillates the arm 66 in a counter-clockwise direction around the pivot 67. This causes the brake to be gradually and slowly applied. Thus, the motor comes to rest with the parts in the position shown in Fig. 2. During this operation, the shaft 60 has turned one-half revolution and in so doing has turned the cranks 63 from one position to another and through chains 64 adjusted the dampers or other connected devices accordingly.

It will be seen that the stopping and releasing means comprise a device actuated by the motor itself to apply a brake to the motor and reacting in so doing against an abutment, which abutment may be withdrawn magnetically. By the train of elements employed the force by which the pad 68 bears against the flange 53 is very greatly reduced at the abutment, i. e., at the armature 80. This assures a very easy release, assuring certainty of operation, saving of battery current, and avoidance of sticking of the delicate thermostat contacts.

When the device is used as a heat regulator motor, its operations are controlled by a thermo switch located in the apartment the temperature of which is to be regulated. Such a switch is illustrated schematically in Fig. 9 where the numeral 90 represents the thermo responsive element having a contact arm 91 playing between two contacts 92 and 93. A conductor 94 runs from the thermo responsive element 90 to the binding post 95, a battery 96 being included in the circuit. A conductor 97 connects the contact 92 with binding post 98, while another conductor 99 connects contact 93 with binding post 100. Each of said binding posts is mounted on but insulated from the cover plate 26. Also mounted on said cover plate in insulated relation are two brushes 101 and 102. These brushes lie near the cover plate and are engageable alternately with a pin 103 carried by the gear 61. The binding post 98 is connected with the brush 101 through conductor 104 and the binding post 100 is connected to brush 102 by means of conductors 105 and 106 and the switch 109. Although the switch 109 has certain advantages, as will be pointed out hereinafter, it is not necessary and applicants prefer to omit it. In that event, conductors 105 and 106 are unitary. Such preferred form has the great advantage that all the electric connections are on the cover plate 26, which permits complete assembly of the electrical elements while the cover plate is detached and permits detachment of the cover plate at any time without disturbing the electrical connections. One end of the magnet coil is grounded to the frame by conductor 107, preferably through the safety switch to be described later, and the other end is connected to the binding post 95 by conductor 108.

In the position of the parts as shown the drafts are turned off and the temperature is assumed to be falling. When the desired temperature has been reached, the arm 91 contacts the point 93. A circuit is now established as follows, battery 96, conductor 94, parts 90, 91, 93, 99, 100, 105, 109, 106, 102, 103, the frame of the motor, conductor 107, magnet 81, conductor 108, binding post 95, and back to the battery. The magnet is thus energized and the motor is released for operation. During said operation the pin 103 is moved away from the brush 102 into contact with brush 101 thus preparing the device for operation upon the rising of the temperature and the closing of the contact between arm 91 and contact 92.

When the motor is being used without the electric rewinding motor 36, it is possible that rewinding may be overlooked. If this should occur, the drafts might be left open and the temperature rise to an uncomfortable point. To avoid this, it is proposed as an alternative form to provide some form of safety means as the cut out switch 109. This may consist of switch contacts 110 and 111, mounted on a block 111' of insulating material, and a bridging element 112, the latter being mounted on an insulating arm 113 pivoted on the shaft 33. Also pivoted on the shaft 33 is the arm 114 upon which the holding pawl 40 is mounted. A spring 115 (Fig. 6) tends to hold the arm 114 downward and to hold the arm 113 to the right (Fig. 6). However, the main springs when sufficiently wound to operate the motor will react on the shaft 33 sufficiently to cause the ratchet wheel 39 to turn the ratchet 40 which in turn attempts to turn the arm 114 on its axis. This reaction is sufficient to overcome the bias of the spring 115 so that the parts remain in the position shown in Figs. 3 and 6, the switch remaining closed. However, if the main springs are run down this reaction decreases until a point is reached where the spring 115 can swing the arm 114 and thereby move the bridge piece 112 away from the contacts 110 and 111. The circuit is thus broken after the springs are so far run down as to be unable to operate the motor. As this switch is in the draft opening side, the last operation will always be a draft closing one, as is desired. This safety feature is not employed when the electric rewind motor is used. Furthermore, it is not absolutely necessary even with hand winding as it has been found that when the springs are almost run down the motor will usually stop in some midway position where the pin 103 does not contact either of the brushes, and when the drafts are in an intermediate position.

The motor 36 is attached to the spring motor by simply sliding it into the shaft 33. It is provided with a hole which receives an extension of the bracket 36' (Fig. 8).

The conductor 107 (Fig. 5) may be attached to the frame of the motor if desired. However, it is desirable to provide an additional safety cut out. For this reason, the conductor 107 is shown in the drawings connected to the finger 120 which is mounted on and insulated from the cover plate 26. Its lower end is shown bent down to contact with the lever 77 when the parts are in the position shown in Fig. 2. Its middle portion is, however, bent up so that when the lever 77 is in the position shown in Fig. 5, the finger 120 does not touch the lever 77. It will be apparent that the circuit will be broken just as soon as the motor is released, thus avoiding wasting battery current which would otherwise occur while the motor is starting up and until the pin 103 moves away from the brush 101 or 102. (See also Fig. 5A.) Instead of a battery, a transformer giving low voltage alternating current may be employed. This alternating current tends to vibrate the armature and thus make objectionable noise. This would continue until the pin 103 clears the brushes, but is overcome by the use of this cut out.

What is claimed is:

1. A device of the character described, comprising, in combination, an energy supplying device, means for adjusting a damper or the like, a speed governor, said adjusting means and governor being operated by said energy supplying device, and means whereby energy from the energy supplying device may be applied to arrest the motion of said governor and of said adjusting means.

2. A device of the character described, comprising, in combination, an energy supplying device, means for adjusting a damper or the like, an increasing velocity gear train, said adjusting means and gear train being operated by said energy supplying device, and means whereby energy from said energy supplying device may be applied to arrest the motion of said adjusting means and said gear train by arresting the rotation of a high velocity element of said gear train.

3. A device of the character described, comprising, in combination, an energy supplying device, means for adjusting a damper or the like, a speed governor, said adjusting means and governor being operated by said energy supplying device, and means whereby energy from the energy supplying device may be applied to arrest the motion of said governor and of said adjusting means, said arresting means comprising an element operated upon by the energy supplying device and having connections supported by a removable abutment.

4. A device of the character described, comprising, in combination, an energy supplying device, means for adjusting a damper or the like, a speed governor, said adjusting means and governor being operated by said energy supplying device, and means whereby energy from the energy supplying device may be applied to arrest the motion of said governor and of said adjusting means, said arresting means comprising an element operated upon by the energy supplying device and having connections supported by a removable abutment, and magnetic means for removing the abutment.

5. A device of the character described, comprising, in combination, an energy supplying device, means for adjusting a damper or the like, a speed governor, said adjusting means and governor being operated by said energy supplying device, and means whereby energy from the energy supplying device may be applied to arrest the motion of said governor and of said adjusting means, said arresting means comprising an element operated upon by the energy supplying device and having connections supported by a removable abutment, magnetic means for removing the abutment, and means for restoring said connections to bear upon said abutment.

6. A device of the character described, comprising, in combination, an energy supplying device, means for adjusting a damper or the like, an increasing velocity gear train, said adjusting means and gear train being operated by said energy supplying device, and brake means actuated by energy from said energy supplying device for stopping the motion of said adjusting means and said gear train by applying a friction brake to a high velocity element of said gear train.

7. A device of the character described, comprising, in combination, an energy supplying device, means for adjusting a damper or the like, an increasing velocity gear train, said adjusting means and gear train being operated by said energy supplying device, and brake means actuated from said energy supplying device for stopping the motion of said adjusting means and said gear train, comprising a brake lever mounted on a floating pivot, a movable support for said pivot, means for holding said support in position so that the floating pivot is in effective position, said holding means comprising a removable abutment, and magnetic means for removing said abutment.

8. A device of the character described, comprising, in combination, an energy supplying device, means for adjusting a damper or the like, an increasing velocity gear train, said adjusting means and gear train being operated by said energy supplying device, and means actuated from said energy supplying device for stopping the motion of said adjusting means and said gear train, said stopping means being mounted on a movable support and means for holding said support in effective position, said holding means comprising a removable abutment.

9. A device of the character described, comprising, in combination, an energy supplying device, means for adjusting a damper or the like, an increasing velocity gear train, said adjusting means and gear train being operated by said energy supplying device, and means actuated from said energy supplying device for stopping the motion of said adjusting means and said gear train, said stopping means being mounted on a movable support and means for holding said support in effective position, said holding means comprising a removable abutment, and means operated by said damper adjusting means for actuating said stopping means when the support is in effective position to stop the gear train and adjusting means.

10. A device of the character described, comprising, in combination, an energy supplying device, means for adjusting a damper or the like, an increasing velocity gear train, said adjusting means and gear train being operated by said energy supplying device, and means actuated from said energy supplying device for stopping the motion of said adjusting means and said gear train, said stopping means being mounted on a movable support and means for holding said support in effective position, said holding means comprising a removable abutment, and means operated by said damper adjusting means for actuating said stopping means when the support is in effective position to stop the gear train and adjusting means, and magnetic means for removing the abutment so as to permit operation of the gear train and adjusting means.

11. A device of the character described, comprising, in combination, an energy supplying device, means for adjusting a damper or the like, an increasing velocity gear train, said adjusting means and gear train being operated by said energy supplying device, and means actuated from said energy supplying device for stopping the motion of said adjusting means and said gear train, said stopping means being mounted on a movable support and means for holding said support in effective position, said holding means comprising a removable abutment, and means operated by said damper adjusting means for actuating said stopping means when the support is in effective position to stop the gear train and adjusting means, and magnetic means for removing the abutment so as to permit operation of the gear train and adjusting means, said stop actuating means being so constructed and arranged as to move away from said stopping means as the device operates, and means for restoring the support to effective position.

12. A device of the character described, comprising, in combination, an energy supplying device, means for adjusting a damper or the like, an increasing velocity gear train, said adjusting means and gear train being operated by said energy supplying device, and means actuated from said energy supplying device for stopping the motion of said adjusting means and said gear train by stopping the rotation of a high velocity element of said gear train, a movable support for holding said stopping means in effective position, a removable abutment for said support, an electro magnet for withdrawing said abutment and switch means actuated by the movement of said movable support to open the circuit through said magnet upon removal of said abutment and movement of said support.

13. In a distant controlled motor for heat regulators, a casing, motor mechanism therein, a cover for said casing, electromagnetic means for permitting operation of said motor mechanism, electric means operating in cooperation with said electromagnetic means, said electromagnetic and electric means being all mounted on said cover, whereby the cover may be removed without dislocating said electric means.

14. In a distant controlled motor for heat regulators, motor mechanism, an electromagnet for permitting operation of said motor mechanism, electric circuits containing said electromagnet, an armature attractable by said magnet, motor releasing means normally supported by said armature, a switch and means for opening said switch as soon as the magnet is energized and the armature is attracted.

ALLEN A. DICKE.
CARL H. DICKE.